Patented Apr. 30, 1935

1,999,723

UNITED STATES PATENT OFFICE 1,999,723

PRECIPITATION OF METAL HALIDE ADDITION COMPOUNDS OF DIAZONIUM HALIDES

Lawrence H. Flett, Hamburg, N. Y., assignor to National Aniline & Chemical Co. Inc., New York, N. Y., a corporation of New York No Drawing. Application September 28, 1933, Serial No. 691,358

12 Claims. (Cl. 260—11)

This invention relates to the production of solid stable diazo compounds, and more particularly, to improvements in the precipitation of metal halide addition compounds of diazonium halides from solutions thereof or containing them.

In the dyeing of textile fibers by the so-called "ice color" process, a diazotized aromatic amine or suitable derivative thereof (such as may be obtained by diazotizing a primary aromatic amine, amino azo compound or amino polyazo compound, which contains one or more primary amino groups and which may be further substituted by one or more halogen atoms and/or alkyl, nitro, alkoxy, alkylamino, acylamino, arylamino, etc. groups) is coupled with a suitable coupling component or so-called developer in the presence of the fiber to be dyed. It has heretofore been proposed to supply the dyer with the diazotized aromatic amine (the so-called "diazo compound") in the form of a double or mixed salt of the diazonium halide and one or more halides of a heavy metal (as, for example, the chloride, bromide or iodide of zinc, tin, copper, platinum, mercury, gold, cadmium, etc.) which may be employed in the dyeing process, and thereby obviate the necessity of preparation of the diazo compound by the dyer. While in some cases the heavy metal halide double or mixed salts of the diazonium halides are insoluble in the solutions or reaction mixtures resulting from the preparation of the said double salts, in many cases the double salts are relatively soluble in the said solutions or reaction mixtures and do not precipitate or only partially precipitate from their solutions, and it is necessary to resort to crystallization or other means for recovering the product. It has been proposed to precipitate the double halide of certain heavy metals and diazo compounds from their solutions by salting them out with common salt (sodium chloride). This procedure has the disadvantage, however, that in some cases the yield is low and/or the product separates in the form of a "mush" which is difficult to filter and dry.

According to the present invention, the halides of magnesium, strontium and calcium, and particularly magnesium chloride, are employed to produce precipitation or salting out of the heavy metal halide double or mixed salts of diazonium halides from their solutions. I have found, by carrying out the precipitation of the mixed or double halides of a heavy metal and a diazonium compound in accordance with the present invention, that improvements in the operation of the process and/or in the results obtained are secured. Thus, I have found by employing magnesium chloride, for example, instead of common salt in the precipitation of a mixed chloride of zinc, tin and a diazonium compound derived from a nitro-methoxy derivative of aniline, for example, the yield of mixed chloride is greater and the precipitate is more easily filtered from the mother liquor.

In the practice of the present invention in accordance with one method of procedure, the aromatic amino compound desired to be produced in the form of a stable diazo salt is diazotized in a suitable acid medium (for example, hydrochloric or sulfuric acid) upon completion of the diazotization, the heavy metal halide or a mixture of heavy metal halides is added; and then there is added to the resulting mixture a soluble halide of magnesium, strontium or calcium (for example, magnesium chloride) in an amount adapted to salt out the heavy metal halide double or mixed salt of the resulting diazonium salt in the form of a halide.

As illustrative embodiments of a manner in which the invention may be practiced, the following examples are presented. The parts are by weight.

Example 1.—5 - nitro - 2 - amino - anisole (118 parts) is diazotized by treating it with hydrochloric acid (200 parts of 31.5 per cent acid) and sodium nitrite (52 parts of 96% NaNO$_2$) while maintained at a temperature of about 0° to about 5° C. Upon completion of diazotization, the solution is filtered, if necessary, and in either case, there is added with stirring a mixture of zinc chloride (140 parts) and stannic chloride (4 parts), and when the zinc and stannic chlorides have dissolved, magnesium chloride (271 parts) is added to the resulting solution, the temperature of the solution being maintained throughout at about 0° to about 5° C. As a result of the addition of the magnesium chloride, a precipitate is formed of a mixed salt containing zinc chloride, tin chloride and 5-nitro-anisole-2-diazonium chloride, which is then filtered off from the mother-liquor and dried in any suitable manner. The yield of mixed salt thus obtained is considerably higher than that obtained by the use of common salt as the precipitating agent and, furthermore, the precipitate is in a readily filterable form as distinguished from the difficultly filterable precipitate obtained with the aid of sodium chloride.

Example 2.—3 - nitro - 4 - amino - anisole (126 parts) is diazotized by treating it with hydrochloric acid (186 parts of 32.3% acid) and sodium nitrite (60 parts), there is added with stirring an aqueous solution of zinc and tin chlorides (60 parts of zinc chloride and 3.4 parts of stannic chloride in 65 parts of water), and magnesium chloride (300 parts) is then added and the mixture is stirred for about thirty minutes, the temperature of the solution being maintained throughout at about 0° to about 5° C. As a result of the addition and stirring with magnesium chloride, a precipitate is formed of a mixed salt containing zinc chloride, tin chloride, and 3-nitro-anisole-4-diazonium chloride, which is then filtered off from the mother-liquor and dried in a suitable manner.

It will be realized by those skilled in the art that the invention is not limited to the details of the above examples nor to the ingredients, proportions, order of steps, and the like, except as indicated in the appended claims. Thus, diazonium compounds derived from other aromatic primary amines of the same or related type as those of the above specific examples may be employed, including not only diazotized, unsubstituted and substituted aromatic primary amines, but also diazotized and tetrazotized amino azo compounds, amino polyazo compounds, polyamino azo compounds, polyamino polyazo compounds, etc., for example, 4-amino-dimethylaniline, 2-dimethyl-amino-5-amino-benzoic acid, 4-benzoylamino-2,5-diethyoxyaniline, benzidine, dianisidine, alpha-aminoanthraquinone, 4,4'-diamino-diphenylamine, 4-chlor-2-amino-diphenylether, 4-amino-4'-methoxy-diphenylamine, alpha-naphthylamine, aminoazobenzene, aminoazotoluene, 4-amino-benzene-azo-alpha-naphthylamine, 4-methoxy-benzene-azo-alpha-naphthylamine, 2-chlorbenzene-azo-2'-chlor-4'-aminonaphthalene, aminobenzene-azo-benzene-azo-alpha-naphthylamine, benzene-2,5-disulfonic acid-azo-4'-amino-naphthalene-6'-sulfonic acid, etc. The invention is of particular importance in the precipitation of mixed salts of diazonium compounds derived from negatively substituted, unsulfonated aromatic primary amines, more particularly, those derived from negatively substituted aromatic primary amines of the benzene series which are free from a sulfonic acid and a carboxyl group; as, for example, 3-chloraniline, 2,5-dichloraniline, 4-chlor-2-nitroaniline, 3-nitro-4-amino-toluene, 4-nitro-2-amino-anisole, etc. The temperature, furthermore, is not limited to the range specified in the examples; thus, temperatures within the range from —10° to 35° C. may be employed. Low temperatures (e. g., in the neighborhood of 5° C. or lower) are preferred, however.

If desired, the diazotization may be carried out with the aid of sulfuric acid instead of hydrochloric acid; but in that case a halide of magnesium (e. g., magnesium chloride) is preferably employed as the salting out agent rather than a halide of calcium or strontium, inasmuch as if the latter are used the insoluble sulfates of calcium and strontium are also likely to precipitate and contaminate the resulting diazonium double or mixed halides.

The halides of other heavy metals, alone or in admixture, may be employed, furthermore, to form the double or mixed halides with diazonium compounds; as, for example, the chlorides, bromides or iodides of zinc, tin, copper, platinum, mercury, gold, cadmium, etc. Instead of adding the magnesium, strontium or calcium halide to the diazotized reaction mass containing the heavy metal halide, the magnesium, strontium or calcium halide may be formed in the reaction mass or may be added before the heavy metal halide.

I claim:

1. The process which comprises precipitating a mixed salt of a heavy metal halide and a diazonium halide from a solution thereof by the action of a halide of one of the metals magnesium, strontium and calcium.

2. The process which comprises precipitating a mixed salt of a heavy metal halide and a diazonium halide from a solution thereof by the action of a halide of magnesium.

3. The process which comprises precipitating a mixed salt of a heavy metal chloride and a diazonium chloride from a solution thereof by the action of a chloride of magnesium.

4. The process which comprises salting out a mixed salt of zinc and tin halides and a diazonium halide from an aqueous solution thereof with a magnesium halide.

5. The process which comprises salting out a mixed salt of zinc and tin chlorides and a diazonium chloride of the benzene and naphthalene series free from a carboxyl and a sulfonic acid group from an aqueous solution of said chlorides with magnesium chloride.

6. The process which comprises diazotizing a diazotizable aromatic amine of the benzene and naphthalene series, whereby the corresponding diazonium compound is produced in solution, adding a heavy metal halide to the resulting reaction mixture, and salting out the mixed halides of the heavy metal and the diazonium compound from the resulting solution with a magnesium halide.

7. The process which comprises diazotizing in the presence of hydrochloric acid a diazotizable aromatic amine of the benzene and naphthalene series containing a negative substituent but free from a carboxyl and a sulfonic acid group, whereby the corresponding diazonium chloride is produced in solution, adding a heavy metal chloride to the resulting reaction mixture, and salting out a mixed chloride of the heavy metal and the diazonium compound from the resulting solution with magnesium chloride.

8. The process which comprises diazotizing a diazotizable aromatic amine of the benzene and naphthalene series free from a carboxyl and a sulfonic acid group and containing a negative substituent, whereby the corresponding diazonium compound is produced in solution, adding zinc and tin chlorides to the resulting reaction mixture, and salting out the mixed chlorides of zinc, tin and the diazonium compound from the resulting solution with magnesium chloride.

9. The process which comprises diazotizing in the presence of hydrochloric acid a primary amine of the benzene series containing an alkoxy group and a nitro group as substituents but free from a carboxyl group and a sulfonic acid group, whereby the corresponding diazonium chloride is produced in solution, dissolving zinc and tin chlorides in the resulting reaction mixture, and salting out the mixed chlorides of zinc, tin and the diazonium compound from the resulting solution with magnesium chloride.

10. The process which comprises diazotizing nitro amino anisole with sodium nitrite and hydrochloric acid, adding a mixture of zinc chloride and stannic chloride to the resulting diazotization reaction mixture, and precipitating a mixed salt containing zinc chloride, tin chloride and the resulting nitro anisole diazonium chloride from the resulting solution by adding magnesium chloride thereto.

11. The process which comprises diazotizing a nitro amino anisole with sodium nitrite and hydrochloric acid, adding a mixture of zinc chloride and stannic chloride to the resulting diazotization reaction mixture, and precipitating a mixed salt containing zinc chloride, tin chloride and the resulting nitro anisole diazonium chloride from the resulting solution by adding magnesium chloride thereto, the temperature being maintained throughout at about 0° to about 5° C.

12. The process which comprises diazotizing 118 parts of 4-nitro-2-amino-anisole with hydrochloric acid and sodium nitrite, dissolving 140 parts of zinc chloride and 4 parts of stannic chloride in the resulting solution free from insoluble matter, and precipitating a mixed salt containing zinc chloride, tin chloride and the resulting nitro anisole diazonium chloride from the resulting solution by adding magnesium chloride thereto, the temperature being maintained throughout at about 0° to about 5° C.

LAWRENCE H. FLETT.